Sept. 22, 1964     G. BOMBARDIER     3,149,738

TRAILER FOR ENDLESS TRACK VEHICLE

Filed Feb. 18, 1963

INVENTOR
Germain BOMBARDIER

By Pierre Lesperance

AGENT

United States Patent Office 3,149,738
Patented Sept. 22, 1964

3,149,738
TRAILER FOR ENDLESS TRACK VEHICLE
Germain Bombardier, Valcourt, Quebec, Canada
Filed Feb. 18, 1963, Ser. No. 259,342
Claims priority, application Canada, Apr. 17, 1962,
847,025, Patent 678,788
9 Claims. (Cl. 214—506)

The present invention relates to a trailer more specifically designed for carrying a small snow-going endless track vehicle of the type described in U.S. Patent 3,023,824 dated March 6, 1962, inventor Joseph Armand Bombardier.

As described in the above-noted U.S. patent, the endless track vehicle comprises a longitudinal endless track, centrally located and protruding from underneath the vehicle chassis and mounted on said chassis by means of an elastic suspension, and a pair of forwardly located skis extending on each side of the tracks and which can be steered. These skis protrude forwardly from the endless track.

It is often necessary to carry such an endless track vehicle over roads by means of a trailer hitched to the back of a motor vehicle, such as a passenger car. Up to now, the trailers used for carrying said endless track vehicle were heavy and cumbersome and did not enable the easy loading and unloading of the endless track vehicle, so much so because the latter does not have any reverse drive.

The general object of the present invention resides, therefore, in the provision of a trailer for transporting an endless track vehicle, which is of a very light weight construction, which takes up a minimum of space, and which enables very easy loading and unloading of the endless track vehicle under it own power.

Yet another object of the present invention resides in the provision of a trailer of the character described, which does not have any resilient suspension because the road bumps are absorbed by the resilient suspension of the endless track vehicle itself.

Another object of the present invention resides in the provision of a trailer of the character described, which is provided with very simple and easily and rapidly operable means for clamping the endless track vehicle to the trailer.

Still another object of the present invention resides in the provision of a trailer of the character described, which has a frame shaped in such a way as to constitute lateral abutment means for the endless track and for the skis of the endless track vehicle, in order to prevent any lateral displacement of the vehicle with respect to the trailer during transport.

Still another object of the present invention resides in the provision of a trailer of the character described, which is of tubular and open work construction, in order to prevent snow from accumulating on said trailer, this being important because snow would impede loading of the vehicle on the trailer.

The foregoing and other important objects of the present invention will become more apparent during the following disclosure and by referring to the drawings, in which.

Figure 1:
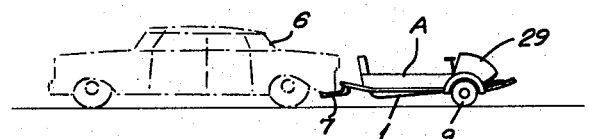
FIGURE 1 is a schematic side elevation of a passenger motor vehicle pulling a trailer in accordance with the invention and on which is loaded an endless track vehicle of the type described in the above-noted U.S. patent.

Referring now more particularly to the drawings in which like reference characters indicate like elements throughout, the trailer in accordance with the invention comprises a tubular frame 1, preferably made of steel tubing, having a U-shape, the legs of which are straight and slightly diverging towards the back of the trailer, said legs being connected by a curved U-shaped front part 3, to the center of which is secured a hitching cap 4, of conventional construction and provided with a clamping bolt 5 for securing the cap 4 to a conventional ball-like member mounted at the back of a passenger motor vehicle 6 by means of arms 7 or other means.

The outer ends of legs 2 of frame 1 are welded, or otherwise rigidly secured to a straight transverse tube 8, which protrudes laterally from legs 2 and which supports at its outer ends freely rotatable pneumatic wheels 9.

Figure 3:
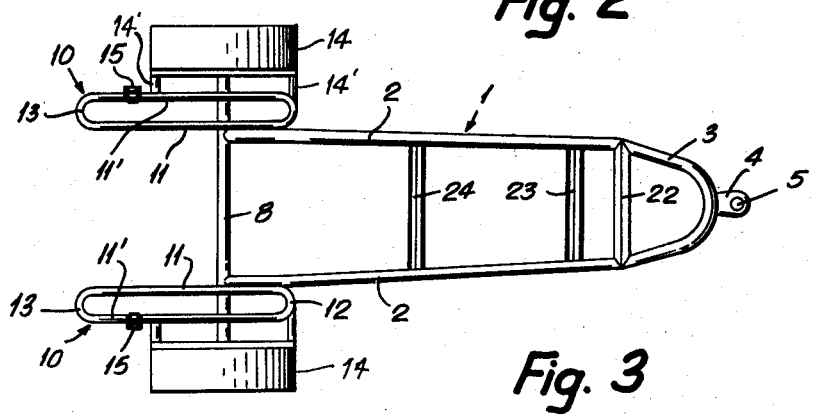
FIGURE 3 is a top plan view of the trailer in accordance with the invention.
Figure 4:
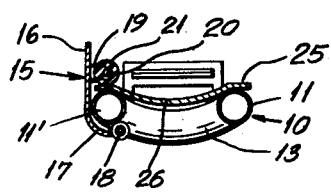
FIGURE 4 is a section taken along line 4—4 of FIGURE 2.

Elongated ski-supporting frames 10, also preferably made of steel tubing, are secured to the portions of transverse tube 8 between legs 2 and wheels 9, and are also welded directly to the portions of legs 2 adjacent to transverse tube 8. Ski-supporting frames 10 have straight and parallel inner and outer sides 11 and 11' and a front end 12 and a back end 13, both of curved shape when seen in plan view, as shown in FIGURE 3, and also of slightly concave shape when seen in elevation, as shown in FIGURE 4. More specifically, the central part of end portions 12 and 13 is slightly recessed with respect to sides 11 and 11'. Frames 10 lie in a plane which is slightly inclined upwardly and rearwardly with respect to the plane containing frame 1 and are secured to transverse tube 8 in such a way that they protrude rearwardly of said tube 8 to a greater extent that they protrude forwardly. In other words, frames 10 are offset towards the back with respect to the axis of the wheels 9.

Mud guards 14 of semi-circular shape enclose the top portion of wheel 9 and are secured to frames 10 by means of brackets 14'.

Clamping members 15 for the skis S of the endless track vehicle A are mounted on frames 10. Each clamping member 15 consists of an arm 16, the lower curved or bent part 17 of which is pivoted at its end on a rod 18, which is secured by means of ears to the outer side 11' of frame 10 just at the back of the mud guard 14. The outer end portion of lever arm 16 has bent ears 19 which carry a shaft 20, which extends therebetween and on which is mounted a rubber roller 21.

Pivot rod 18 of arm 16 is slightly laterally offset towards the inside of frame 10 and rubber roller 21 is adapted to contact the top part of tubular side 11' when the clamping member is in closed clamping position, even if there are no skis on frames 10.

Transverse bars 22, 23, and 24 interconnect legs 2 of frame 1 to reinforce said frame and also to serve as support for the vehicle A.

Figure 2:
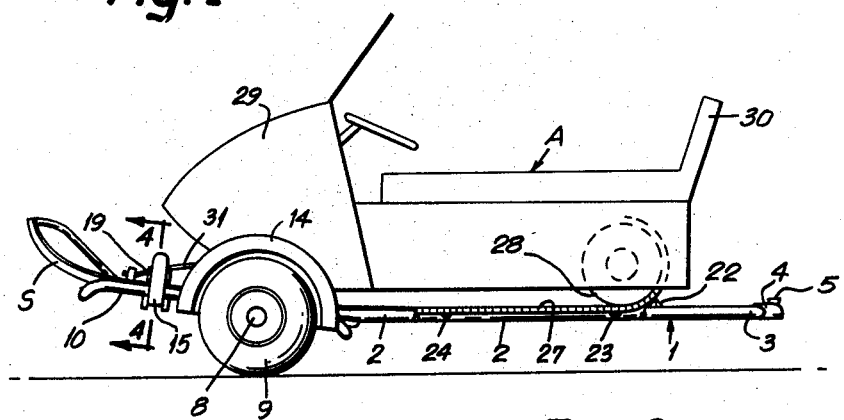
FIGURE 2 is a side elevation on an enlarged scale of the trailer and the vehicle mounted thereon.

Bars 22, 23, and 24 are preferably angle irons, disposed to form a V. The front bar 22 has its V in inverted position, its apex edge protruding upwardly from the top of legs 2 of frame 1. The upper free edges of the legs of the V's of intermediate bar 23 and back bar 24 are at a lower level than the top of legs 2 of frame 1, as shown in FIGURE 2.

When the vehicle A is in position on the trailer of the present invention, its skis S are supported by and fit within frames 10 with only the flat and straight sides 25 of said skis bearing on sides 11 and 11' of frames 10, while the central curved portions 26 of the skis fit between the sides 11 and 11' of frames 10.

The ends of the skis protrude from the back and front ends of frames 10. Because the central part 26 of the skis abuts against the inside of sides 11 and 11' of frame 10, and due to the weight of vehicle A, the skis cannot become laterally displaced relative to frames 10. Once the skis are in position, the clamping members 15 are simply pivoted on pivot rods 18 from a hanging position into a clamping position, as shown in FIGURE 4, in which the roller 21 engages the top face of the side 25 of ski S. In this position, the clamping members cannot open by themselves due to the fact that the pivotal axis 18 is laterally offset inwardly with respect to the side 11' of frames 10. However, it is only necessary to slightly pull on arm 6 in order to open the clamping member and release ski S.

In the loaded position of the vehicle A, the portion of the endless track 27 of said vehicle, in engagement with the rear sprocket wheels 28 of said vehicle, abuts against front transverse bar 22 of the trailer and also rests on intermediate bar 23. The back transverse bar 24 of the trailer supports the central portion of the endless track system. Because intermediate bar 23 and back bar 24 are at a lower level than legs 2 of frame 1, said legs 2 serve as lateral abutments for the track which is completely located between the legs 2 and, therefore, the latter prevents lateral displacement of the vehicle A with respect to the trailer.

In the loaded position of the vehicle A, the engine of the latter, which is disposed under hood 29, is located just forwardly of wheels 9 of the trailer and, therefore, the center of gravity of the assembly of the vehicle and trailer is just ahead of the wheels and one person can easily handle the trailer and its load by raising front curved part 3.

Normally, the clamipng members 15 are sufficient for firmly retaining the vehicle on the trailer; however, if it is desired to travel on particularly rough roads, there can be provided a supplementary attachment, which would consist of a chain or rope provided with a spring and hook and attached either to the forward curved part 3, or to cap 4, and to the back 30 of the vehicle A.

It should be noted that the trailer in accordance with the present invention does not have any elastic or spring suspension for the wheels 9, because the suspension of the vehicle A itself is sufficient to prevent damage to the vehicle. The vehicle suspension comprises springs for the track 27 and also springs 31 for the skis S. The spring suspension for the track itself has been described in U.S. Patent 3,023,824, mentioned hereinabove.

To load vehicle A on the trailer, one detaches the trailer from the motor vehicle or car 6 and moves the trailer so as to present front curved part 3 to the front of the snowgoing vehicle A. Front part 3 is allowed to rest on the ground whereby frame 1 is slightly upwardly and rearwardly inclined. The vehicle A is started and is driven onto the trailer and its skis S slide on the ground on the outside side of and along the legs 2 of the frame 1 until the front part of the track 27 of vehicle A engages over the front part 3 of the trailer. At the same time, the skis S start to climb on the front ends 12 of frames 10. The endless track 27 of the vehicle A almost immediately engages transverse bar 22 which, due to its sharp apex edge, prevents slipping of the track with respect to frame 1, whereby the vehicle A, under its own power, can be driven over the trailer to finally take its loaded position, as shown in FIGURE 2.

The clamping members 15 are closed in clamping position over skis S, as shown in FIGURE 4, and the trailer is thereafter hitched to the back of the passenger car 6 by means of bolt 5.

To unload the vehicle A, the clamping members 15 are opened and the vehicle A is driven under its own power, rearwardly of the trailer, whereby skis S climb down from the back end 13 of frames 10, and track 27 of the vehicle A climbs over and down the transverse tube 8. For unloading the vehicle, it is not essential to detach the trailer from the car 6 because the trailer is only slightly raised from the ground.

The very low center of gravity of the assembly of the trailer and vehicle A constitutes an additional safety factor, specially when the car 6 pulls its load at relatively high speed.

While a preferred embodiment in accordance with the present invention has been illustrated and described, it is understood that various modifications may be resorted to without departing from the spirit and scope of the appended claims.

What I claim is:

1. A trailer for transporting a snow-going endless track vehicle on roads, said vehicle being of the type comprising a central endless track and a pair of front skis laterally offset outwardly from said track, said trailer comprising a chassis consisting of spaced longitudinal members, wheels supporting said chassis and disposed exteriorly of said longitudinal members, spaced transverse bars interconnecting said longitudinal members, said transverse bars adapted to be engaged by said track, and two open work elongated frames secured to said chassis exteriorly of said longitudinal members, but inwardly of said wheels and serving to receive said skis, each frame comprising parallel, spaced, and straight sides, adapted to engage underneath the sides of the skis, the central part of said skis freely fitting within said frames, and clamping means for clamping said skis to said frames, pivotally mounted on said frames and pivotable into a clamping position engaging the top face of a side of said skis.

2. A trailer as claimed in claim 1, wherein said clamping means consist for each frame, of an arm having a curved inner end pivotally mounted underneath one side of said frame, an elastic roller mounted adjacent the free end of said arm and facing said one side of said frame to contact the top face of the ski side in the clamping position of said arm.

3. A trailer as claimed in claim 1, wherein said frames and said chassis are constituted by metal tubular members.

4. A trailer as claimed in claim 1, wherein said transverse bars have a V-shaped cross-section to form substantially sharp edges, which prevent slipping of said track upon loading of the vehicle unto said trailer.

5. A trailer as claimed in claim 4, wherein certain ones of said transverse bars are at a lower level than said longitudinal members of said chassis, whereby said track abuts against said longitudinal members when said vehicle is in loaded position, to prevent lateral displacement of said track on said trailer.

6. A trailer for a snow-going endless track vehicle of the type comprising a central longitudinal endless track and a front pair of skis located forwardly of and laterally outwardly of said track, each ski having substantially flat sides and a central part which is depressed with respect to said sides, said trailer comprising a chassis formed of a tubular U-shaped element forming legs and a bight, and a transverse tube secured to the free ends of said legs, wheels rotatably mounted on the ends of said transverse tube and outwardly spaced from said legs, tubular elongated open work frames secured to the outside of said legs and to said transverse tube between said wheels and said legs and protruding from said transverse tube in a direction away from the said bight, transverse bars secured to said legs of said U-shaped element and spaced from each other to support said track between said legs, said frames serving to support said skis with the flat sides of said skis resting on the sides of said frame, and the central part of said skis fitting within said frames, and clamping members pivotally connected to the exterior side of said frames and capable of taking a clamping position engaging the top face of one side of said skis.

7. A trailer as claimed in claim 6, wherein certain ones of said bars are at the lower level than the top of the legs of said chassis, whereby said track can abut against said legs of said chassis, thereby preventing lateral displacement of said vehicle with respect to said trailer.

8. A trailer as claimed in claim 7, wherein one of said transverse bars protrudes upwardly with respect to the top of the legs of said chassis to abut against the back of said track.

9. A trailer as claimed in claim 6, further including hitching means mounted on said bight for removably hitching said trailer to the back of a motor vehicle.

References Cited in the file of this patent

UNITED STATES PATENTS

| | | |
|---|---|---|
| 2,530,866 | Evans et al. | Nov. 21, 1950 |
| 2,661,108 | Horn et al. | Dec. 1, 1953 |
| 2,903,776 | Roberts | Sept. 15, 1959 |
| 2,968,413 | Heckman | Jan. 17, 1961 |